(12) United States Patent
Yi et al.

(10) Patent No.: US 12,544,599 B2
(45) Date of Patent: Feb. 10, 2026

(54) LEAKAGE-PREVENTING COUPLING STRUCTURE OF TRANSDUCER ARRAY OF HIGH-INTENSITY FOCUSED ULTRASOUND GENERATOR, AND TRANSDUCER ARRAY

(71) Applicant: JEISYS MEDICAL INC., Seoul (KR)

(72) Inventors: Won Ju Yi, Seoul (KR); Eun Kyung Gong, Seoul (KR); Soo Min Hwang, Seoul (KR); Dong Hwan Kang, Seoul (KR)

(73) Assignee: JEISYS MEDICAL INC., Seoul (KR)

( * ) Notice: Subject to any disclaimer, the term of this patent is extended or adjusted under 35 U.S.C. 154(b) by 0 days.

(21) Appl. No.: 18/697,502

(22) PCT Filed: Sep. 16, 2022

(86) PCT No.: PCT/KR2022/013874
§ 371 (c)(1),
(2) Date: Apr. 1, 2024

(87) PCT Pub. No.: WO2023/063601
PCT Pub. Date: Apr. 20, 2023

(65) Prior Publication Data
US 2025/0018228 A1    Jan. 16, 2025

(30) Foreign Application Priority Data
Oct. 12, 2021  (KR) ........................ 10-2021-0134650

(51) Int. Cl.
*A61N 7/02*    (2006.01)
*A61N 7/00*    (2006.01)

(52) U.S. Cl.
CPC ........ *A61N 7/02* (2013.01); *A61N 2007/0078* (2013.01)

(58) Field of Classification Search
CPC .............. A61N 7/02; A61N 2007/0078; A61N 2007/0095; A61N 2007/0026;
(Continued)

(56) References Cited

U.S. PATENT DOCUMENTS

| 6,094,402 A * | 7/2000 | Cooper .................... G10K 9/22 |
| | | 367/173 |
| 2011/0011111 A1 * | 1/2011 | Martin ................. G10K 11/004 |
| | | 165/104.33 |

(Continued)

FOREIGN PATENT DOCUMENTS

| JP | 2001104356 A | 4/2001 |
| JP | 2014514951 A | 6/2014 |

(Continued)

OTHER PUBLICATIONS

International Search Report for PCT/KR2022/013874 mailed Dec. 30, 2022 from Korean Intellectual Property Office.
(Continued)

*Primary Examiner* — Bo Joseph Peng

(57) ABSTRACT

A high-intensity focused ultrasound generator according to the present invention has a plurality of transducers mounted to respective transducer holders and the transducer holders detachably coupled to an ultrasonic radiation frame, and thus allows easy replacement and repair of the transducers in a separate manner, and further, by sealing between the inner surface of the transducer holder and the transducer by means of the adhesion of a flexible glue, leakage may be prevented, and the front surface of the transducer is not blocked by the glue, and thus loss of ultrasonic energy generated forward from the front surface of the transducer may be prevented and efficiency may be enhanced.

20 Claims, 5 Drawing Sheets

(58) Field of Classification Search
CPC  A61N 2007/0056; B06B 1/06; B06B 1/0607; B06B 2201/40; B06B 2201/76; A61B 8/00; G10K 11/004; G10K 9/22
See application file for complete search history.

(56) References Cited

U.S. PATENT DOCUMENTS

| | | | |
|---|---|---|---|
| 2014/0058297 A1 | 2/2014 | Clark | |
| 2015/0042206 A1* | 2/2015 | Nguyen | G01F 1/662 310/311 |
| 2017/0059530 A1* | 3/2017 | Kandori | A61B 5/0095 |

FOREIGN PATENT DOCUMENTS

| | | |
|---|---|---|
| JP | 2017042204 A | 3/2017 |
| KR | 10-2008-0040111 A | 5/2008 |
| KR | 10-2011-0074326 A | 6/2011 |
| KR | 10-2013-0055972 A | 5/2013 |
| KR | 10-1457666 B1 | 11/2014 |
| KR | 10-1554846 B1 | 9/2015 |
| KR | 20170028862 A | 3/2017 |
| KR | 10-1952588 B1 | 2/2019 |

OTHER PUBLICATIONS

Japanese Patent Office, Notice of Reasons for Refusal regarding Application No. 2024-520022, Jan. 29, 2025.
Korean Patent Office, Notice of Submission of Opinions regarding Application No. 10-2023-0178601, Dec. 2, 2024.
International Preliminary Report on Patentability received for PCT Patent Application No. PCT/KR2022/013874, mailed on Apr. 25, 2024, 11 pages (7 pages of English Translation and 4 pages of Original Document).

* cited by examiner

LEAKAGE-PREVENTING COUPLING STRUCTURE OF TRANSDUCER ARRAY OF HIGH-INTENSITY FOCUSED ULTRASOUND GENERATOR, AND TRANSDUCER ARRAY

CROSS REFERENCE TO PRIOR APPLICATIONS

This application is the 35 U.S.C. 371 national stage of international application PCT/KR2022/013874 filed on Sep. 16, 2022 which claims priority to Korean Patent Application No. 10-2021-0134650 filed on Oct. 12, 2021. The entire contents of each of the above-identified applications are hereby incorporated by reference.

TECHNICAL FIELD

The present invention relates to a leakage-preventing coupling structure of a transducer array of a high-intensity focused ultrasound generator, and a transducer array to which the same are applied, and more particularly, to a leakage-preventing coupling structure of a transducer array of a high-intensity focused ultrasound generator, whereby a plurality of transducers are individually mounted on an ultrasonic radiation frame using transducer holders so that sealing for preventing a leakage can be performed and replacement or repair can be individually performed.

BACKGROUND ART

In general, high-intensity focused ultrasound generators are apparatuses that generate high-intensity ultrasonic energy by focusing ultrasonic waves generated by transducers to rise the temperature of an affected area by irradiating high-intensity ultrasonic energy to the affected area of a patient so that the affected area can be treated without surgery.

When several tens or several hundreds of transducers are used in a high-intensity focused ultrasound generator according to the related art, a plurality of transducers are mounted on the front surface of an ultrasonic radiation frame and then the whole front surface of the ultrasonic radiation frame is coated with glue to form a waterproof layer so that the plurality of transducers are fixed by the waterproof layer and a leakage can be prevented.

However, since ultrasonic energy generated by the transducers in a forward direction is absorbed by the waterproof layer, there is a problem that input voltages need to be increased to compensate therefor, and there is a problem that the ultrasonic radiation frame needs to be replaced even if only one of the plurality of transducers breaks down.

DETAILED DESCRIPTION OF THE INVENTION

Technical Problem

The present invention provides a leakage-preventing coupling structure of a transducer array of a high-intensity focused ultrasound generator, whereby a leakage can be blocked and replacement and repair can be easily performed, and a transducer array to which the same are applied.

Technical Solution

According to an aspect of the present invention, there is provided a leakage-preventing coupling structure of a transducer array of a high-intensity focused ultrasound generator, the leakage-preventing coupling structure including: an ultrasonic radiation frame having a concave front surface and a plurality of coupling holes formed therein; a plurality of transducer holders respectively inserted into the plurality of coupling holes in front of the ultrasonic radiation frame and detachably coupled to the ultrasonic radiation frame while passing through the ultrasonic radiation frame; and a plurality of transducers respectively mounted in the plurality of transducer holders so that front surfaces of the plurality of transducers are exposed, wherein adhesion between at least one of the rear surface and the side surface of each of the transducers and each of the transducer holders may be performed using an adhering member, and sealing between an inside of the transducer holder and the transducer may be performed so that vibration of the transducer is enabled inside the transducer holder, and sealing between the transducer holder and the ultrasonic radiation frame may be performed using a sealing member.

Each of the transducer holders may include: a head portion mounted on the front surface of the ultrasonic radiation frame and having a seating groove in which the transducer is insertedly seated, formed therein; and a body portion extending from the head portion backward and coupled to the coupling holes using a fastening member from a rear of the ultrasonic radiation frame while passing through the coupling holes.

At least a part of side surfaces of the seating groove may be formed to be open so that vibration of the transducer is enabled inside the seating groove.

A plurality of support protrusions may be formed on the head portion of the transducer holder to protrude from a bottom surface of the seating groove, to support a lower surface of the transducer and to form a separation space between the transducer and the bottom surface.

A locking protrusion may be formed on the head portion of the transducer holder to protrude from the bottom surface of the seating groove and to have a tip bent inwardly so as to prevent deviation of the transducer inserted into the seating groove.

The sealing member may include an O-ring inserted into a ring-shaped groove formed from the head portion in the rear surface toward the ultrasonic radiation frame.

Electrical wire holes through which electrical wires connected to the transducer pass so that the electrical wires may be pulled out to a rear of the ultrasonic radiation frame, are formed in the transducer holder, and sealing between the electrical wires and the electrical wire holes may be undertaken with glue for waterproofing.

The body portion of the transducer holder may include: a shaft portion extending from the head portion backward and being pressed into the coupling holes; and a screw portion extending from the shaft portion backward and coupled to the fastening member in the rear of the ultrasonic radiation frame after passing through the coupling holes.

The sealing member may include: an O-ring inserted outside the shaft portion; and an O-ring pressing member inserted outside the shaft portion from a rear of the O-ring and allowing the O-ring to be in close contact with the rear surface of the ultrasonic radiation frame.

The fastening member may include a nut, and the sealing member may further include a washer provided between the O-ring pressing member and the nut.

According to another aspect of the present invention, there is provided a leakage-preventing coupling structure of a transducer array of a high-intensity focused ultrasound generator high-intensity, the leakage-preventing coupling structure including: an ultrasonic radiation frame having a probe arranged in a center of the front surface and a plurality of coupling holes formed based on the probe; a plurality of transducer holders respectively inserted into the plurality of coupling holes in front of the ultrasonic radiation frame and detachably coupled to the ultrasonic radiation frame in the rear of the ultrasonic radiation frame while passing through the ultrasonic radiation frame; and a plurality of transducers respectively mounted in an open front surface of at least a part of the plurality of transducer holders, wherein the transducer holder may include: a head portion mounted on the front surface of the ultrasonic radiation frame and having a seating groove in which the transducer is insertedly seated, formed therein; and a body portion extending from the head portion backward and coupled to the coupling holes using a fastening member from a rear of the ultrasonic radiation frame while passing through the coupling holes and having electrical wire holes through which electrical wires connected to upper and lower surfaces of the transducer pass, formed therein, and adhesion between at least one of the rear surface and the side surface of each of the transducers and each of the transducer holders may be performed using an adhering member, and sealing between an inside of the transducer holder and the transducer may be performed so that vibration of the transducer is enabled inside the transducer holder, and adhesion between the electrical wires and the electrical wire holes may be performed using glue for waterproofing, and sealing between the front surface of the ultrasonic radiation frame and the head portion of the transducer holder may be performed using a first sealing member, and sealing between the rear surface of the ultrasonic radiation frame and the body portion of the transducer holder may be performed using a second sealing member.

At least a part of side surfaces of the seating groove may be formed to be open so that vibration of the transducer is enabled inside the seating groove.

A plurality of support protrusions may be formed on the head portion of the transducer holder to protrude from a bottom surface of the seating groove and support a lower surface of the transducer and to form a separation space between the transducer and the bottom surface.

A locking protrusion may be formed on the head portion of the transducer holder to protrude from the bottom surface of the seating groove and to have a tip bent inwardly so as to prevent deviation of the transducer inserted into the seating groove.

The first sealing member may include an O-ring inserted into a ring-shaped groove formed from the head portion in the rear surface toward the ultrasonic radiation frame.

The body portion of the transducer holder may include: a shaft portion extending from the head portion backward and being pressed into the coupling holes; and a screw portion extending from the shaft portion backward and coupled to the fastening member in the rear of the ultrasonic radiation frame after passing through the coupling holes.

The second sealing member may include: an O-ring inserted outside the shaft portion; and an O-ring pressing member inserted outside the shaft portion from a rear of the O-ring and allowing the O-ring to be in close contact with the rear surface of the ultrasonic radiation frame.

The second fastening member may further include a washer provided between the O-ring pressing member and the fastening member.

According to another aspect of the present invention, there is provided a transducer array of a high-intensity focused ultrasound generator to which the leakage-preventing coupling structure is applied.

Effects of the Invention

In a high-intensity focused ultrasound generator according to the present invention, a plurality of transducers are individually mounted on transducer holders, and the transducer holders are detachably coupled to an ultrasonic radiation frame and thus, transducers can be easily individually replaced or repaired.

In addition, by sealing through adhesion between the inside of the transducer holder and the transducer by means of a flexible glue, a leakage can be blocked, and the front surface of the transducer is not blocked by the glue so that loss of ultrasonic energy generated by the front surface of the transducer in a forward direction can be prevented and thus efficiency can be enhanced.

In addition, by adhesion between the inside of the transducer holder and the transducer by means of the flexible glue, the location of the transducer is fixed while the vibration of the transducer is enabled, and thus the vibration wave energy loss of the transducer can be reduced.

Furthermore, by sealing between the transducer holders and the ultrasonic radiation frame by means of a sealing member such as an O-ring, a leakage in a backward direction from the front surface of the ultrasonic radiation frame can be prevented, and the transducer holders can easily be attached to and detached from the ultrasonic radiation frame.

MODE OF THE INVENTION

Hereinafter, embodiments of the present invention will be described in detail with reference to the accompanying drawings.

A high-intensity focused ultrasound generator according to an embodiment of the present invention is an apparatus using high-intensity focused ultrasound (HIFU). The high-intensity focused ultrasound generator may include a transducer array in which several tens or several hundreds of transducers are radially arranged, thereby treating the affected area of a patient with tumor, etc., stimulating the brain to treat diseases such as Alzheimer's or depression, and increasing immunity by heating specific areas.

Figure 1:
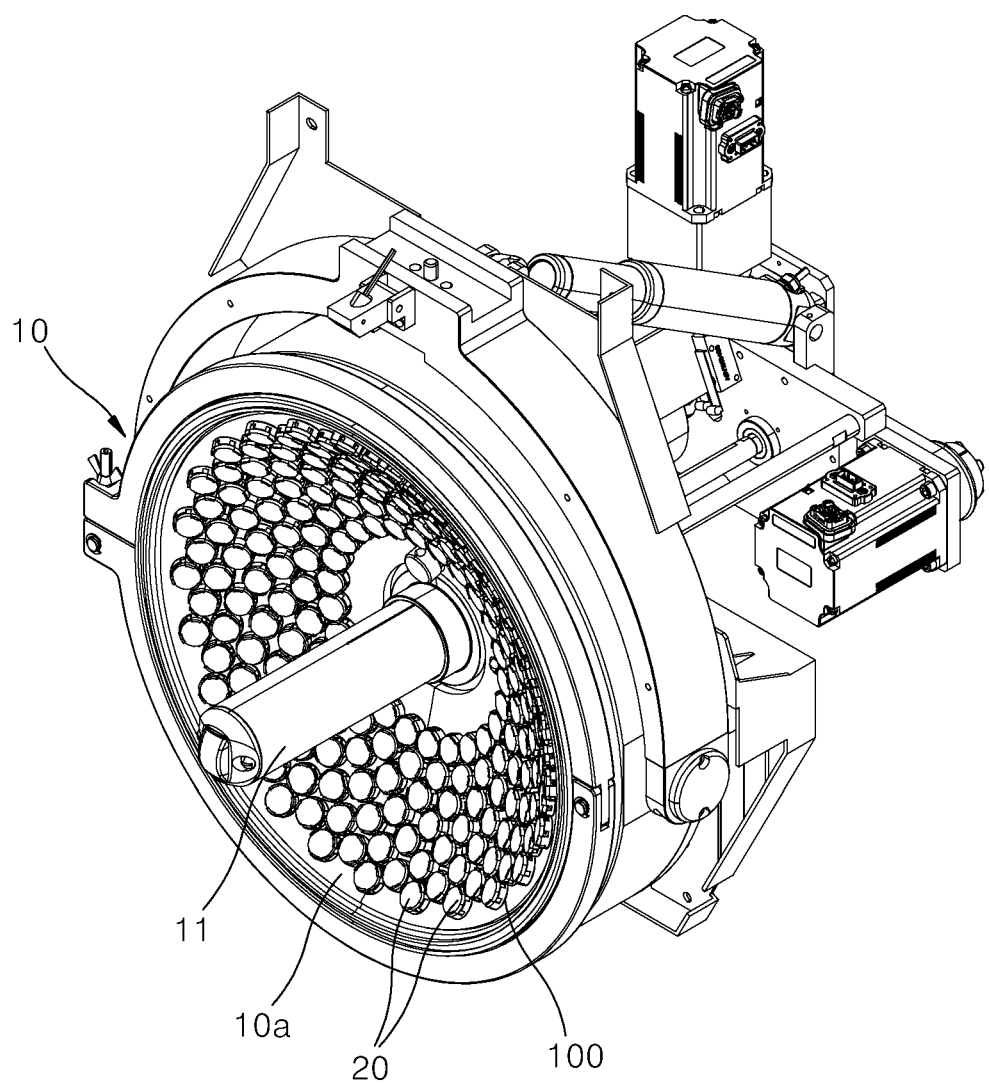
FIG. 1 is a perspective view illustrating a head module of a high-intensity focused ultrasound generator according to an embodiment of the present invention.
Figure 2:
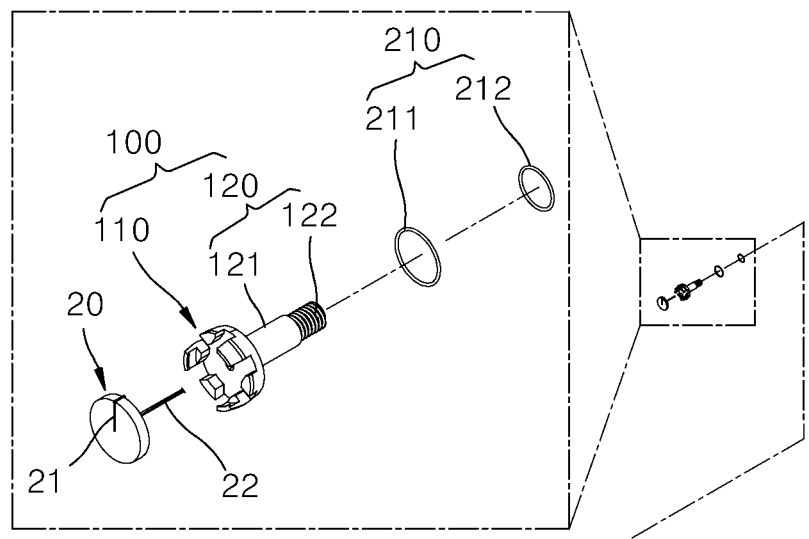
FIG. 2 is an exploded perspective view illustrating a coupling structure of an ultrasonic radiation frame and a transducer holder according to an embodiment of the present invention.
Figure 2:
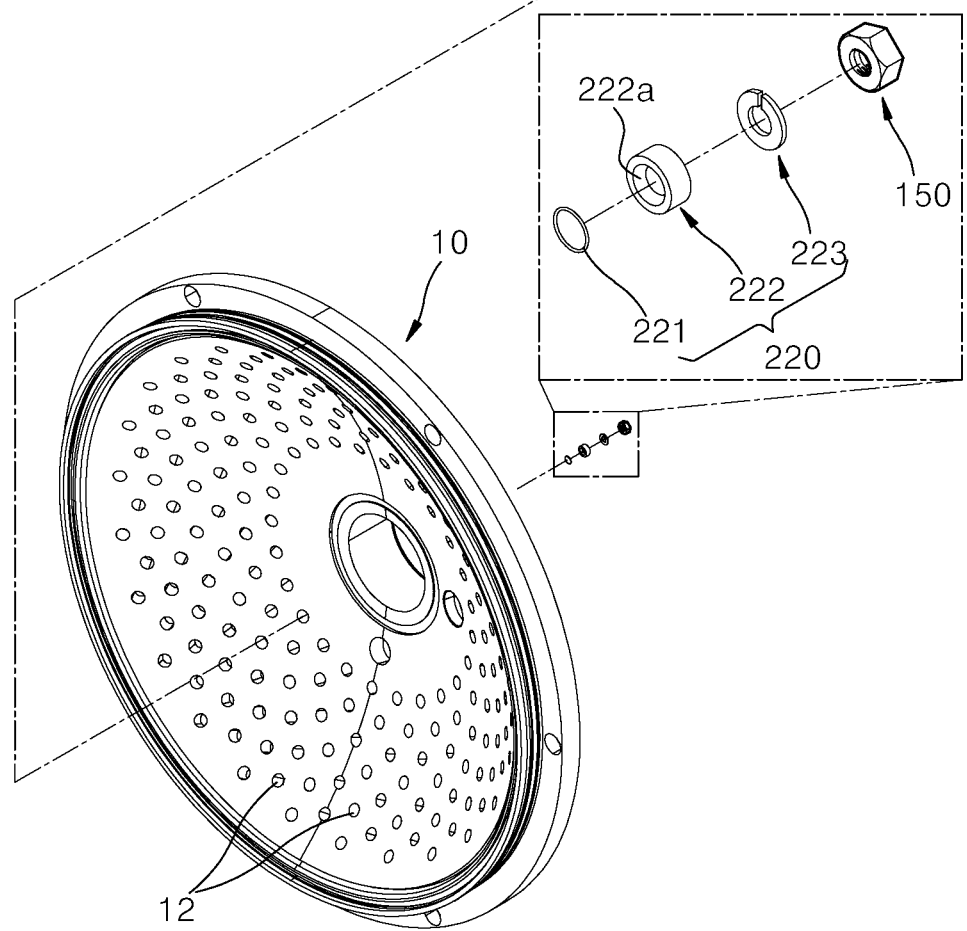

FIG. 1 is a perspective view illustrating a head module of a high-intensity focused ultrasound generator according to an embodiment of the present invention. FIG. 2 is an exploded perspective view illustrating a coupling structure of an ultrasonic radiation frame and a transducer holder according to an embodiment of the present invention.

Referring to FIGS. 1 and 2, the head module of the high-intensity focused ultrasound generator includes an ultrasonic radiation frame 10, a plurality of transducers 20, and a plurality of transducer holders 100.

The ultrasonic radiation frame 10 includes a probe 11 coupled to the center of a front surface 10a, and a plurality of coupling holes 12 arranged radially based on the probe 11. The ultrasonic radiation frame 10 is formed to have a dish shape with a concave front surface to focus ultrasound waves radiating from the plurality of transducers 20 to radiate the ultrasound waves to one place.

The plurality of coupling holes 12 are through holes spaced apart from each other at certain intervals. The number of the coupling holes 12 is set according to the number of the transducers 20.

The plurality of transducers 20 may include a piezoelectric element. Each of the transducers 20 generates ultrasound waves when receiving voltages. An example in which the transducer 20 has a disc shape, will be described. Several tens or several hundreds of transducers 20 are radially arranged to form a transducer array. The number of the transducers 20 may be set according to ultrasonic energy to radiate.

First and second electrical wires 21 and 22 are connected to upper and lower ends of the transducer 20. The first electrical wire 21 is connected to the transducer 20 at the center of the front surface of the transducer 20 by soldering, and the second electrical wire 22 is connected to the transducer 20 at the center of the rear surface of the transducer 20 by soldering. The first electrical wire 21 and the second electrical wire 22 are pulled out to the rear of the ultrasonic radiation frame 10 through electrical wire holes of the transducer holder 100 and are connected to a separate circuit board.

The transducer holder 100 is detachably coupled to each of the plurality of coupling holes 12. Each transducer 20 is coupled to the transducer holder 100.

Figure 3:
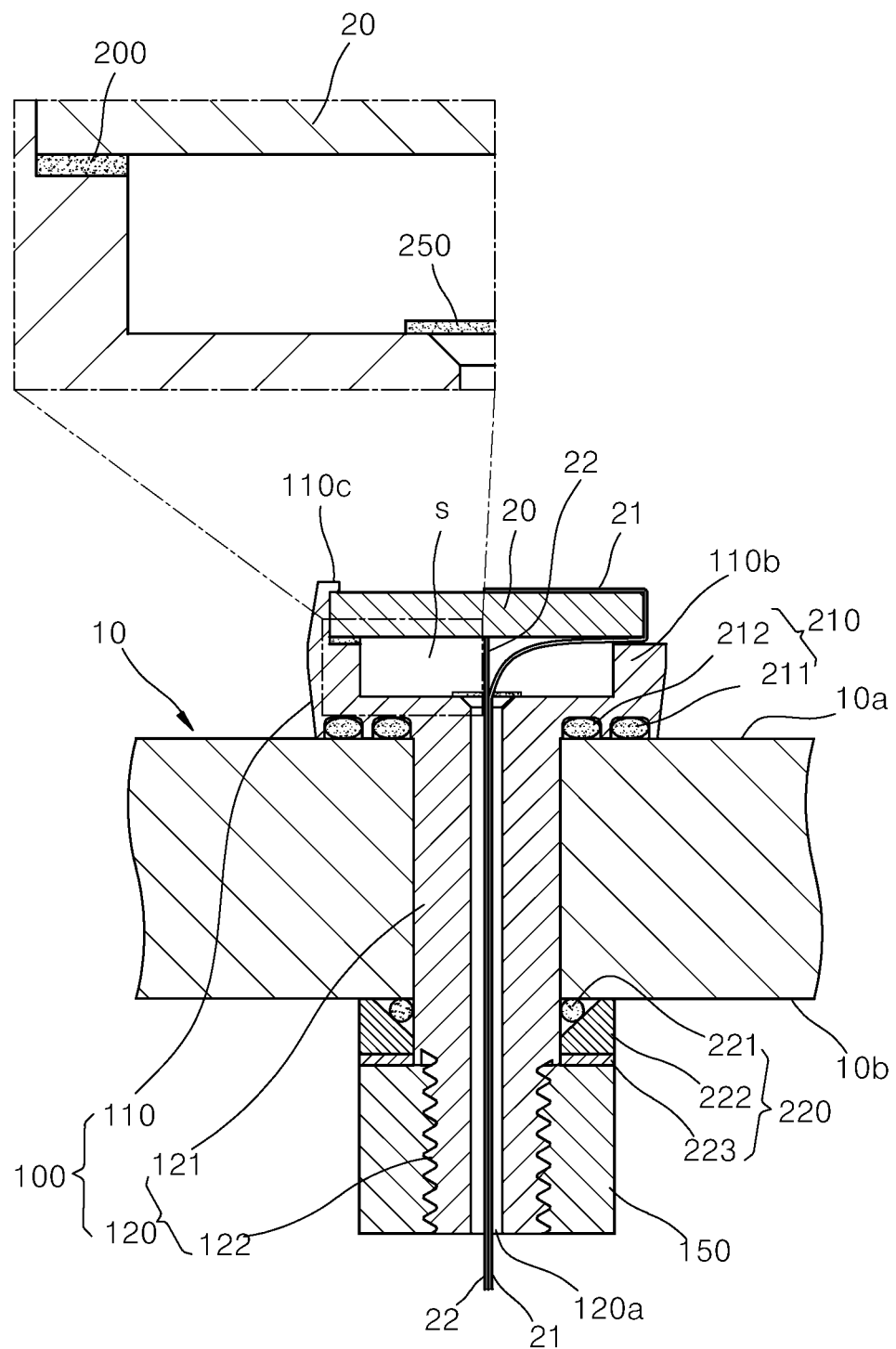
FIG. 3 is a cross-sectional view illustrating the coupling structure of the ultrasonic radiation frame and the transducer holder according to an embodiment of the present invention.
Figure 4:
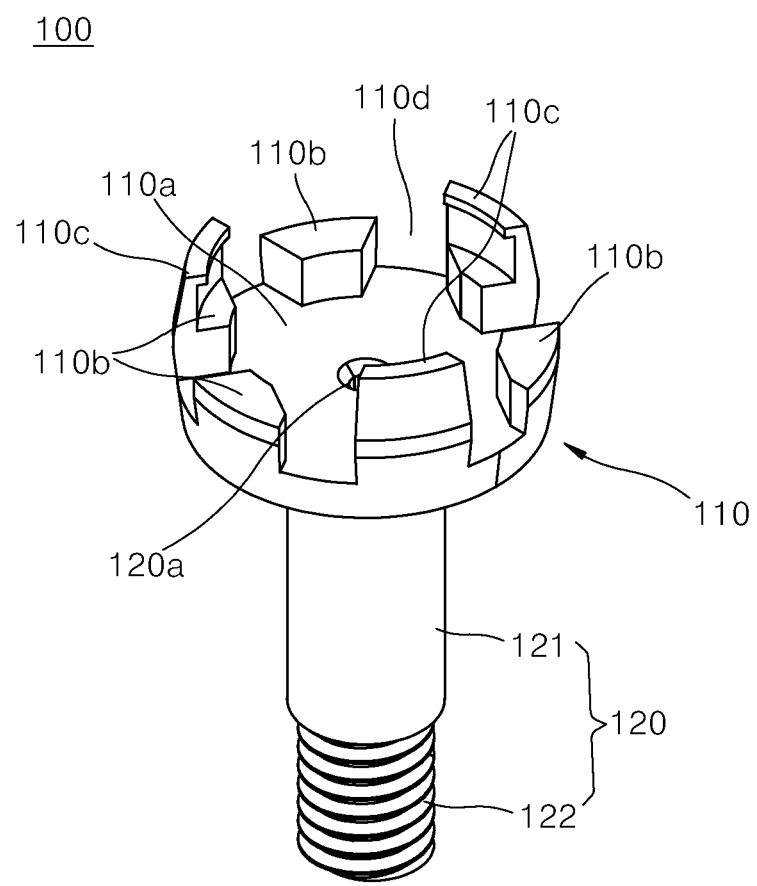
FIG. 4 is a front perspective view of a transducer holder according to an embodiment of the present invention.
Figure 5:
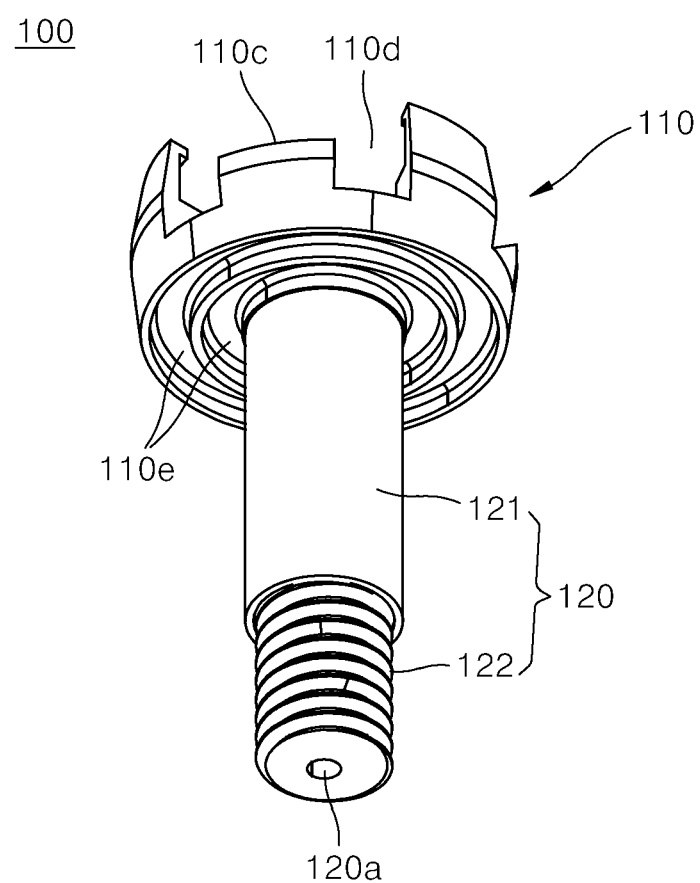
FIG. 5 is a rear perspective view of the transducer holder shown in FIG. 4.

Referring to FIGS. 3 through 5, the transducer holder 100 includes a head portion 110 with a seating groove 110a into which the transducer 20 is insertedly seated, and a body portion 120 which extends from the head portion 110 backward and is coupled to the coupling holes 12.

The head portion 110 is greater in diameter than the coupling holes 12 so as to be seated on the front surface 10a of the ultrasonic radiation frame 10. The head portion 110 includes the seating groove 110a, a support protrusion 110b, a locking protrusion 110c, and an opening 110d.

The seating groove 110a is formed in the front of the head portion 110 to have an open front surface, such that the transducer 20 is seated thereon.

The support protrusion 110b is a stepped protrusion that protrudes from a bottom surface of the seating groove 110a in a forward direction to a certain height so as to support a lower surface of the transducer 20. The support protrusion 110b forms a separation space S between the lower surface of the transducer 20 and the bottom surface of the seating groove 110a to form a passage through which the first and second electrical wires 21 and 22 coupled to the transducer 20 pass, thereby implementing an electrode structure stably and maximizing vibration wave energy of the transducer 20 by enabling vibration of the transducer 20. The support protrusion 110b is formed in plurality, and a plurality of support protrusions 110b are spaced apart from each other at certain intervals.

The locking protrusion 110c protrudes from the bottom surface of the seating groove 110a and has a tip bent inwardly so that deviation of the transducer 20 inserted into the seating groove 110a can be prevented. The tip of the locking protrusion 110c may be changed as long as it has a shape in which deviation of the transducer 20 can be prevented, such as a hook shape, etc. The locking protrusion 110c is formed in plurality, and the plurality of locking protrusions 110c are spaced apart from each other at certain intervals. In the present embodiment, an example in which some of the plurality of locking protrusions 110c protrude from the support protrusions 110b, will be described.

The opening 110d is cut from side surfaces of the seating groove 110a and is formed to be open. The opening 110d allows the transducer 20 to vibrate inside the seating groove 110a so that vibration wave energy of the transducer 20 may be maximized.

It is preferable that the body portion 120 is formed to extend from the head portion 110 backward and to pass through the coupling holes 12. The body portion 120 is formed to have a smaller diameter than a diameter of the head portion 110. Electrical wire holes 120a are formed in the center of the body portion 120 so that the first and second electrical wires 21 and 22 connected to the transducer 20 may pass through the electrical wire holes 120a.

The body portion 120 includes a shaft portion 121 and a screw portion 122.

The shaft portion 121 extends from the head portion 110 backward and is formed in a cylindrical shape to be pressed into the coupling holes 12.

The screw portion 122 extends from the shaft portion 121 backward, and has a screw thread fastened to an outer circumferential surface of the screw portion 122 by a fastening member 150.

The fastening member 150 is preferably, a nut, but embodiments are not limited thereto.

Meanwhile, FIG. 3 is a cross-sectional view 3 illustrating the coupling structure of the ultrasonic radiation frame and the transducer holder according to an embodiment of the present invention.

Referring to FIG. 3, each of the transducers 20 is adhered by an adhering member inside the transducer holder 100.

An example in which the adhering member is a flexible glue, will be described. A flexible glue layer 200 is formed between at least one of the rear surface and the side surface of the transducer 20 and the head portion 110 using the flexible glue. The flexible glue may be silicon or epoxy-based glue, and may be applied as long as it is formed of a flexible material.

In the present embodiment, an example in which the flexible glue layer 200 is formed between the rear surface of the transducer 20 and the support protrusion 110b, will be described. However, embodiments are not limited thereto, and the flexible glue layer 200 may be formed between the side surface of the transducer 20 and an inner side of each of the locking protrusions 110c. That is, the flexible glue layer 200 may be applied in any location where the front surface of the transducer 20 is not blocked.

The transducer 20 is adhered to the transducer holder 100 and is fixed thereto using the flexible glue, so that the location of the transducer 20 is fixed inside the transducer holder 100 and the transducer 20 may vibrate and thus, the vibration wave energy loss of the transducer 20 may be minimized. Also, since the glue is not applied onto the front surface of the transducer 20, the loss of ultrasonic energy radiating from the transducer 20 forward can be prevented. That is, since the flexible glue layer 200 is formed at only the rear surface or side surface of the transducer 20, the flexible glue layer 200 does not cover the front surface of the transducer 20 and thus, there are no restrictions in radiation of ultrasonic energy through the front surface.

Also, sealing between the transducer holder 100 and the ultrasonic radiation frame 10 is performed using a sealing member.

The sealing member includes a first sealing member 210 for sealing between the head portion 110 of the transducer holder 100 and the front surface 10a of the ultrasonic radiation frame 10, and a second sealing member 220 for sealing between the body portion 120 and a rear surface 10b of the ultrasonic radiation frame 10.

An example in which the first sealing member 210 includes two first and second O-rings 211 and 212 that are inserted into the rear surface of the head portion 110 and coupled to each other, will be described. However, embodiments are not limited thereto, and the number of the first sealing members 210 may be changed in various ways and applied. Also, the first sealing member 210 may be used as long as it is formed of various materials such as silicon, rubber or the like and has a sealing structure, except for an O-ring.

It is preferable that the first O-ring 211 and the second O-ring 212 are formed to have different diameters. The first O-ring 211 and the second O-ring 212 are inserted into a ring-shaped groove 110e formed in the rear surface of the head portion 110 and are sealed while being in close contact with the front surface 10a of the ultrasonic radiation frame 10.

The second sealing member 220 includes a third O-ring 221 inserted outside the shaft portion 121 of the body portion 120, and an O-ring pressing member 222 inserted outside the shaft portion 121 in a backward direction of the third O-ring 221 and allowing the third O-ring 221 to be in close contact with the rear surface 10b of the ultrasonic radiation frame 10.

The O-ring pressing member 222 is formed to have a ring shape, and includes an inclined surface 222a on which a part of the third O-ring 221 is seated and which is formed on the front surface of the O-ring pressing member 222.

The second sealing member 220 may further include a washer 223 provided between the O-ring pressing member 222 and the fastening member 150. The washer 223 is not an essential component of the second sealing member 220 and may be additionally provided. The washer 223 may seal the third O-ring 221 and the O-ring pressing member 222 and may hold the transducer holder 100.

The second sealing member 220 may be used as long as it is formed of various materials such as silicon, rubber, etc. and seals, except for an O-ring or a washer.

Also, a glue layer for waterproofing 250 is formed between the electrical wire holes 120a of the transducer holder 100 and the first and second electrical wires 21 and 22 using glue for waterproofing.

In the high-intensity focused ultrasound generator having the above-described configuration, the plurality of transducers 20 are mounted on the ultrasonic radiation frame 10 using the transducer holder 100, so that sealing between the transducer 20 and the transducer holder 100 is performed using the flexible glue and thus, even if the glue is not applied onto all of the front surface of the ultrasonic radiation frame 10, a leakage can be prevented from occurring inwardly from the front surface of the ultrasonic radiation frame 10.

Also, since the glue is not applied onto all of the front surface of the ultrasonic radiation frame 10, all of front surfaces of the transducers 20 is exposed so that the loss of ultrasonic energy radiating from the transducers 20 forward can be prevented. When, as in the related art, the front surfaces of the transducers 20 are blocked by the glue layer, there is a problem that ultrasonic energy is absorbed by the glue layer, but in the present invention, all of the front surfaces of the transducers 20 is exposed and thus this problem can be prevented.

Further, adhesion between the inside of the transducer holder 100 and the transducer 20 is performed using the flexible glue so that the location of the transducer 20 is fixed and vibration of the transducer 20 is enabled while a gap is prevented and thus, the loss of vibration wave energy of the transducer 20 can be reduced.

Moreover, the plurality of transducers 20 are individually mounted through the transducer holders 100, and the transducer holders 100 are detachably coupled to the ultrasonic radiation frame 10 and thus, repair and replacement of the transducers 20 may be individually performed.

In addition, since the plurality of transducers 20 are individually mounted through the transducer holder 100, the capacity of at least a part of the plurality of transducers 20 may be differently configured. For example, the capacity of transducers arranged at the center of the ultrasonic radiation frame 10 may also be increased, and of course, voltages applied to the plurality of transducers 20 may also be differently controlled.

Also, sealing between the transducer holder 100 and the ultrasonic radiation frame 10 may be performed using a sealing member such as an O-ring, so that a leakage can be prevented from occurring from the front surface of the ultrasonic radiation frame 10 backward and the transducer holders may be easily attached to/detached from the ultrasonic radiation frame.

Meanwhile, in the above-described embodiment, an example in which all of the transducers 20 are coupled to the coupling holes 12 of the ultrasonic radiation frame 10, has been described, but embodiments are not limited thereto, and the transducer 20 may also be provided in only at least a part of the coupling holes 12 according to the capacity of the high-intensity focused ultrasound generator. When the transducers 20 are provided in only at least a part of the coupling holes 12, the transducer holders 100 are coupled to all of the coupling holes 12, and a holder cover (not shown) for shielding the open front surface may also be detachably coupled to some of the transducer holders 100 to which the transducers 20 are not coupled. The holder cover (not shown) may be formed of a different material from the transducers 20, may have the same shape as the transducers 20 and may be coupled to the transducers 20 using glue. Thus, the mounting number of the transducers 20 can be adjusted so that the energy capacity of the high-intensity focused ultrasound generator can be adjusted.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a leakage-preventing coupling structure of a transducer array of a high-intensity focused ultrasound generator, whereby a leakage can be prevented and replacement and repair can be easily performed, and a transducer array to which the same are applied, can be manufactured.

The invention claimed is:

1. A leakage-preventing coupling structure of a transducer array of a high-intensity focused ultrasound generator, comprising:
    an ultrasonic radiation frame having a plurality of coupling holes formed therein, wherein the radiation frame includes a concave front surface;
    a plurality of transducer holders respectively inserted into the plurality of coupling holes and coupled to the ultrasonic radiation frame, wherein each of the plurality of transducer holders can be detached from the ultrasonic radiation frame; and
    a plurality of transducers respectively mounted in the plurality of transducer holders;
    wherein each of the transducer holders comprises a head portion mounted on a side of the ultrasonic radiation frame corresponding to the front surface and having a seating groove in which the respective transducer is insertedly seated, formed therein, and further comprises a first sealing member sealing between a rear surface of the head portion and the front surface of the ultrasonic radiation frame.

2. The leakage-preventing coupling structure of claim 1, including an adhering member between at least one of a rear surface and a side surface of each of the transducers and each of the respective transducer holders, wherein the adhering member facilitates sealing between an inside of the transducer holder and the respective transducer so that vibration of the transducer is enabled inside the transducer holder.

3. The leakage-preventing coupling structure of claim 2, wherein the adhering member comprises a glue, and wherein the glue is sufficiently flexible to facilitate vibration of each transducer with respect to the respective transducer holder.

4. The leakage-preventing coupling structure of claim 1, wherein at least a part of side surfaces of the seating groove includes an opening to facilitate vibration of the transducer inside the seating groove.

5. The leakage-preventing coupling structure of claim 1, wherein a plurality of support protrusions are formed on the head portion of each transducer holder, wherein the support protrusions protrude from a bottom surface of the seating groove, to support a lower surface of the respective transducer and to form a separation space between the transducer and the bottom surface.

6. The leakage-preventing coupling structure of claim 1, wherein a locking protrusion is formed on the head portion of each transducer holder, wherein the locking protrusion protrudes from the bottom surface of the seating groove and includes a tip bent inwardly so as to prevent deviation of the respective transducer.

7. The leakage-preventing coupling structure of claim 1, wherein the first sealing member comprises an O-ring inserted into a ring-shaped groove formed from the head portion in a rear surface toward the ultrasonic radiation frame.

8. The leakage-preventing coupling structure of claim 1, wherein an electrical wire hole through which electrical wires connected to the respective transducer pass so that the electrical wires are pulled out to a rear of the ultrasonic radiation frame, are formed in each transducer holder, and wherein the leakage-preventing coupling structure includes glue to facilitate sealing between the electrical wires and the respective electrical wire holes for waterproofing.

9. The leakage-preventing coupling structure of claim 1, wherein each transducer holder further comprises a body portion extending from the head portion backward and coupled to the coupling hole using a fastening member from a rear of the ultrasonic radiation frame while passing through the coupling hole, and the body portion of the transducer holder comprises:
    a shaft portion extending from the head portion backward and being pressed into the coupling hole; and
    a screw portion extending from the shaft portion backward and coupled to the fastening member in the rear of the ultrasonic radiation frame after passing through the coupling hole.

10. The leakage-preventing coupling structure of claim 9, further comprising a second sealing member, the second sealing member comprising:
    an O-ring inserted outside the shaft portion; and
    an O-ring pressing member inserted outside the shaft portion from a rear of the O-ring and allowing the O-ring to be in close contact with the rear surface of the ultrasonic radiation frame.

11. The leakage-preventing coupling structure of claim 10, wherein the fastening member comprises a nut, and the second sealing member further comprises a washer provided between the O-ring pressing member and the nut.

12. A leakage-preventing coupling structure of a transducer array of a high-intensity focused ultrasound generator, comprising:
    an ultrasonic radiation frame having a plurality of coupling holes formed therein, wherein the radiation frame includes a concave front surface;
    a plurality of transducer holders respectively inserted into the plurality of coupling holes and coupled to the ultrasonic radiation frame, wherein each of the plurality of transducer holders can be detached from the ultrasonic radiation frame; and
    a plurality of transducers respectively mounted in an open front surface of at least a part of the plurality of transducer holders;
    wherein each transducer holder comprises:
    a head portion mounted on a side of the ultrasonic radiation frame corresponding to the front surface and having a seating groove in which the transducer is insertedly seated, formed therein; and
    a body portion extending from the head portion backward and coupled to the coupling hole using a fastening member from a rear of the ultrasonic radiation frame while passing through the coupling hole;
    the body portion of the transducer holder comprising a shaft portion extending from the head portion backward and being pressed into the coupling hole, and a screw portion extending from the shaft portion backward and coupled to the fastening member in the rear of the ultrasonic radiation frame after passing through the coupling hole; and
    each transducer holder further comprises a sealing member, the sealing member comprising an O-ring inserted outside the shaft portion, and an O-ring pressing member inserted outside the shaft portion from a rear of the O-ring and allowing the O-ring to be in close contact with the rear surface of the ultrasonic radiation frame.

13. The leakage-preventing coupling structure of claim 12, wherein at least part of side surfaces of the seating groove includes an opening to facilitate vibration of the transducer inside the seating groove.

14. The leakage-preventing coupling structure of claim 12, wherein a plurality of support protrusions are formed on the head portion of each transducer holder, wherein the support protrusions protrude from a bottom surface of the seating groove to support a lower surface of the respective transducer and to form a separation space between the transducer and the bottom surface.

15. The leakage-preventing coupling structure of claim 12, wherein a locking protrusion is formed on the head portion of each transducer holder, wherein the locking protrusion protrudes from the bottom surface of the seating groove and includes a tip bent inwardly so as to prevent deviation of the respective transducer.

16. The leakage-preventing coupling structure of claim 12, including an adhering member between at least one of a rear surface and a side surface of each transducer holder and the respective transducer, wherein the adhering member facilitates sealing between an inside of the transducer holder and the respective transducer so that vibration of the transducer is enabled inside the transducer holder.

17. The leakage-preventing coupling structure of claim 16, wherein the adhering member comprises a glue, and wherein the glue is sufficiently flexible to facilitate vibration of each transducer with respect to the respective transducer holder.

18. The leakage-preventing coupling structure of claim 12, wherein an electrical wire hole through which electrical wires connected to the respective transducer pass so that the electrical wires are pulled out to a rear of the ultrasonic radiation frame, are formed in each transducer holder, and wherein the leakage-preventing coupling structure includes glue to facilitate sealing between the electrical wires and the respective electrical wire holes for waterproofing.

19. The leakage-preventing coupling structure of claim 12, wherein the sealing member further comprises a washer provided between the O-ring pressing member and the fastening member.

20. A device comprises: a focused ultrasonic generator including the leakage-preventing coupling structure of claim 1.

* * * * *